No. 768,806. Patented August 30, 1904.

UNITED STATES PATENT OFFICE.

GEORGE C. KITCHEN, OF HOUSTON HEIGHTS, TEXAS, ASSIGNOR OF ONE-HALF TO J. B. BROCKMAN, OF HOUSTON, TEXAS.

COMPOUND FOR DESTROYING BOLL-WEEVILS.

SPECIFICATION forming part of Letters Patent No. 768,806, dated August 30, 1904.

Application filed December 7, 1903. Serial No. 184,129. (No specimens.)

*To all whom it may concern:*

Be it known that I, GEORGE C. KITCHEN, a citizen of the United States of America, residing at Houston Heights, in the county of Harris and State of Texas, have invented certain new and useful Improvements in Compounds for Destroying Boll-Weevils and other Insects, of which the following is a specification.

To five barrels of water add one-half ($\frac{1}{2}$) barrel of unslaked lime, one-twentieth ($\frac{1}{20}$) of a barrel of calcium carbid, two (2) pounds of copperas, one-fourth ($\frac{1}{4}$) pound asafetida or camphor-gum, one (1) pint oil of pennyroyal, four-fifths ($\frac{4}{5}$) of a barrel of gas-oil or crude petroleum, Beaumont or Sourlake oil preferred, and one-fifth ($\frac{1}{5}$) of a barrel of hydrocarbon, which is a by-product of crude petroleum obtained from the manufacture of Pintsch gas and is that portion of the crude petroleum which liquefies in the process of the manufacture of Pintsch gas from crude petroleum and when so produced is a liquid of a volatile character and in that state is the ingredient herein meant by the term "hydrocarbon;" to be mixed in a vat prepared for the purpose, the water, lime, and carbid to be first added together, the copperas to be dissolved in about half a gallon of hot water, and the asafetida or camphor-gum to be dissolved in sufficient hot water to dissolve it, and when these ingredients are thus dissolved they are to be added to the gas-oil or petroleum and the hydrocarbon and then these latter ingredients so added to be added to and mixed with the mixture composed of the water, lime, and carbid and the whole to be barreled as soon as prepared and kept tightly corked or confined until ready for use to prevent evaporation, or, for the purpose of reducing expenses in shipping, the water, lime, and carbid may be mixed on the plantation and the other mixture in appropriate quantities added after having first been prepared separately and securely barreled and sealed or corked at the factory or place of manufacture; to be thoroughly shaken up or mixed before applied; to be applied by means of any kind of contrivance that will spray the mixture on the plant, such as a knapsack or any other kind of spray pump or spraying apparatus carried and worked by hand or attached to any kind of a wheeled vehicle arranged for the purpose; to be applied whenever the weevil or insects appear, preferably in the latter part of the afternoon and early part of the night, and to be applied about once every two weeks unless excessive rains should occur and wash off the mixture. In such case it should be reapplied as often as thoroughly washed off.

Having fully described the invention, what I claim as new, and desire to secure by Letters Patent, is—

1. The herein-described improvement in compounds for destroying the cotton-boll weevil, and other insects, consisting of the following ingredients, viz., water, unslaked lime, calcium carbid, copperas, camphor-gum, oil of pennyroyal, gas-oil, and hydrocarbon, (the latter being a liquid which is a by-product resulting from the process of manufacturing "Pintsch gas" from crude petroleum-oil).

2. The herein-described improvement in compounds for destroying the cotton-boll weevil, and other insects, consisting of the following ingredients in the following proportions, water, five barrels; unslaked lime, one-half barrel; calcium carbid, one-twentieth of a barrel; copperas, two pounds; camphor-gum, one-fourth pound; oil of pennyroyal, one pint; gas-oil, four-fifths of a barrel; hydrocarbon, (which is a liquid by-product obtained from crude petroleum-oil in the manufacture of "Pintsch gas,") one-fifth of a barrel.

In testimony whereof I affix my signature, in the presence of two witnesses, this 3d day of December, 1903.

GEORGE C. KITCHEN.

Witnesses:
HENRY E. KAHN,
JOHN I. BROCKMAN.